US006954580B2

United States Patent
Soskind et al.

(10) Patent No.: US 6,954,580 B2
(45) Date of Patent: Oct. 11, 2005

(54) OPTICAL RECEIVER WITH HIGH DYNAMIC RANGE

(75) Inventors: Yakov G. Soskind, Plainsboro, NJ (US); Thirukumar Vethanayagam, Levittown, PA (US)

(73) Assignee: JDS Uniphase Corporation, San Jose, CA (US)

( * ) Notice: Subject to any disclaimer, the term of this patent is extended or adjusted under 35 U.S.C. 154(b) by 258 days.

(21) Appl. No.: 10/342,410

(22) Filed: Jan. 13, 2003

(65) Prior Publication Data

US 2003/0223727 A1 Dec. 4, 2003

Related U.S. Application Data

(60) Provisional application No. 60/360,937, filed on Mar. 1, 2002.

(51) Int. Cl.[7] ............................. G02B 6/00; G02B 6/32; G02B 6/42; G01J 1/34
(52) U.S. Cl. ..................... 385/140; 250/227.21; 385/31; 385/33; 385/35
(58) Field of Search ........................... 385/140, 31, 32, 385/33, 34, 35, 52, 139; 250/227.11, 227.21, 227.22, 216

(56) References Cited

U.S. PATENT DOCUMENTS

| | | | |
|---|---|---|---|
| 4,591,231 A | 5/1986 | Kaiser et al. | 350/96.18 |
| 4,904,044 A | 2/1990 | Tamulevich | 350/96.18 |
| 5,087,122 A | 2/1992 | Ostrander et al. | 356/73.1 |
| 5,202,784 A * | 4/1993 | Reddersen | 359/196 |
| 5,325,459 A | 6/1994 | Schmidt | 385/140 |
| 5,745,634 A * | 4/1998 | Garrett et al. | 385/140 |
| 6,130,984 A | 10/2000 | Shen et al. | 385/140 |
| 6,137,941 A | 10/2000 | Robinson | 385/140 |
| 6,149,278 A | 11/2000 | Mao et al. | 359/862 |
| 6,163,643 A | 12/2000 | Bergmann et al. | 385/140 |
| 6,275,320 B1 | 8/2001 | Dhuler et al. | 359/237 |
| 6,292,616 B1 | 9/2001 | Tei et al. | 385/140 |

* cited by examiner

Primary Examiner—Frank G. Font
Assistant Examiner—Charlie Peng
(74) Attorney, Agent, or Firm—Allen, Dyer, Doppelt Milbrath & Gilchrist, P.A.

(57) ABSTRACT

An optical coupling assembly having an optical receiver that exhibits extended dynamic range, and, more particularly, an optical receiver that is integrated with a Variable Optical Attenuator (VOA) to extend the dynamic range of the receiver.

8 Claims, 8 Drawing Sheets

UN-ATTENUATED BEAM

ATTENUATION -3 dB
14 MICRON APERTURE

ATTENUATION -3 dB
20 MICRON APERTURE

ATTENUATION -3 dB
30 MICRON APERTURE

ATTENUATION -3 dB
NO APERTURE

ATTENUATION -20 dB
14 MICRON APERTURE

ATTENUATION -20 dB
20 MICRON APERTURE

ATTENUATION -20 dB
30 MICRON APERTURE

ATTENUATION -20 dB
NO APERTURE

OPTICAL RECEIVER WITH HIGH DYNAMIC RANGE

RELATED APPLICATION PRIORITY DATA

This application claims the benefit of U.S. Provisional Patent Application No. 60/360,937, filed Mar. 1, 2002.

FIELD OF THE INVENTION

The present invention relates to an optical receiver that exhibits extended dynamic range, and more particularly to an optical receiver, that is integrated with a Variable Optical Attenuator (VOA) to extend the dynamic range of the receiver. This invention further relates to a micro-optical coupling subassembly useful to couple light to a small surface area photodetector.

BACKGROUND OF THE INVENTION

Reconfigurable networks that employ active switching, add-drop multiplexing, and wavelength routing cause power level variations. Power levels may also vary as a result of component degradation due to aging or reduction in fiber coupling efficiency. To maintain the power level at the receiver at its optimum value, electrically controllable attenuators may be used. Attenuation of the input signal is also used to extend the dynamic range of the receiver by reducing the input power below the saturation level.

Attenuation of an input signal is accomplished by using an optical attenuator that is typically placed before the receiver. A Variable Optical Attenuator (VOA) is a preferred type of attenuator due to its ability to continuously adjust the amount of optical attenuation.

Based on their principle of operation, VOAs can be divided into different groups.

The simplest type of attenuator is operated by causing relative, variable lateral offset of the input and output fibers, so that the overlap between the input light beam and the core of the output fiber can be adjusted. This type of attenuator is known to be extremely sensitive to small changes in the relative position of the fibers due to, for example, environmental changes (temperature, vibration, etc.)

Several other VOA types achieve attenuation by miscoupling the incoming light while using collimating and/or focusing optics to transform the incoming light. A VOA with a pair of parallel mirrors placed in the optical path of a collimated beam is disclosed in U.S. Pat. No. 6,149,278. Attenuation in such is achieved by rotating the mirrors so that the field distribution in the focal plane of the focusing lens is miscoupled relative to the core of the output fiber. In another U.S. Pat. No. 6,137,941, therein is described a VOA with a pivoting micro-mirror. Rotation of the mirror changes coupling to the output waveguide by lateral displacement (miscoupling) of the light distribution relative to the waveguide which thus causes attenuation of the signal.

The other group of attenuation types uses two lenses in the optical path, where the first lens delivers the incoming light either collimated or focused to the attenuation mechanism. The attenuated balance of the signal is thereafter directed to a focusing lens for coupling to an output fiber. Specifically, these types of attenuators use light absorbers (neutral density filters in U.S. Pat. Nos. 6,292,616; 6,130,984; 4,904,044; 4,591,231; and a bulk absorber in U.S. Pat. No. 5,325,459), or mechanical blockers (U.S. Pat. Nos. 6,275,320; 6,163,643; 5,745,634; 5,087,122) as mechanisms for optical attenuation. In particular, this group conventionally employs a pair of lenses so that the light absorber or blocker which is positioned between these lenses encounters collimated (U.S. Pat. Nos. 6,292,616; 6,130,984;) or focused light (U.S. Pat. Nos. 6,275,320; 6,163,643).

Combining the aforementioned VOAs with a receiver requires coupling of the output fiber to the receiver, thus causing additional insertion loss and, as a consequence of that, degradation in the sensitivity of the combined solution. Integration of that type of VOA with receiver in a single package therefore requires accurate alignment of the active area of the detector to the output beam of VOA, thereby increasing complexity and cost of the packaged solution. In addition to that, the above VOA solutions (except the version with direct fiber coupling) employ two collimating and/or focusing lenses in the optical path. Reduction in the number of the optical components is desirable to further reduce the insertion loss, size, and cost of the integrated VOA and receiver solution.

It would be desirable to provide a receiver with extended dynamic range that integrates attenuation and coupling functionality (e.g. integrates VOA and a Photodetector (PD) in a single packaged device) with improved sensitivity, as well as reduced cost and size.

Turning now to a further aspect of the subject invention, it may be seen that with the growth of optical communication systems and the continuous rising demand for network capacity, an increasing demand exists for high-speed photodetectors (PDs), e.g. p-i-n detectors.

The two principal bandwidth limits of high-speed photodetectors, such as p-i-n PDs, are the bandwidth associated with the carrier transit-time and the bandwidth associated with RC time-constants (see, for example, Ref. 1). The carrier transit-time, photodetector capacitance, and quantum efficiency are interdependent, although, if one reduces the thickness of the absorption layer and the photosensitive area of the photodetector, then the transit-time can be reduced and the bandwidth may be increased. However, reducing the absorption layer thickness will also increase the capacitance of the photodiode which tends to decrease bandwidth. The capacitance can be independently reduced by making the device area smaller, but reduction in photosensitive area makes the efficient coupling of light difficult thus reducing the coupling efficiency and increasing the sensitivity to optical misalignment. The fundamental limitation on the coupling efficiency is due to diffraction when free-space micro-optical components are used.

In all cases, the reduction in absorption layer thickness lowers the intrinsic quantum efficiency of the detector for surface-normal illumination. Several approaches have been developed to circumvent the loss of quantum efficiency (QE) using thin absorption layers.

Edge-coupled waveguide (WG) PDs have been developed and can achieve high speed and high QE if the modal coupling efficiency is high, but coupling tolerances are very small, especially in the direction normal to WG surface. Efficient coupling to WG PDs also requires special means for transforming the mode size from an input fiber to that matching the mode of the WG photodiode. These mode transformers introduce additional sources of losses to the device and are difficult to fabricate.

Alternative coupling approaches are based on the angular (off-normal) incidence to PD photosensitive area, and have been demonstrated using refraction on an angled facet on the photodiode or total internal reflection (TIR). There are several disadvantages in using these existing techniques. The refractive facet or V-groove for TIR mirror is difficult to fabricate, as well as to control the surface geometry with high accuracy. In case of the etched TIR mirror, the etching weakens the (already) fragile PD chip. In addition, the mirror surface should be positioned accurately relative to photosensitive area of the PD, which may be difficult to accomplish. The above coupling schemes also suffer from poor coupling efficiency due to beam divergence caused by diffraction.

It is, therefore, desirable to provide an edge coupling subassembly that does not require the use of PDs with the above mentioned deficiencies, does not require fabrication of special features on the PDs such as mode spot size converters, refractive facets or TIR mirror V-groves, and at the same time, allows achievements in increased responsivity, high bandwidth, and is well suited for high-yield high volume fabrication.

In view of the foregoing, it apparent that there exists in the art a need for apparatus or method which overcomes, mitigates, or solves the above problems in the art. It is a purpose of this invention to fulfill this and other needs in the art which will become more apparent to the skilled artisan once given the following disclosure.

SUMMARY OF THE INVENTION

Generally speaking, this invention fulfills the above described needs in the art by providing: A packaged optical coupling assembly having an integrated selectively positionable optical attenuator comprising:

an optical waveguide for transmitting light having an axis extending therethrough, the optical waveguide having an output end;

a lens for coupling light which exits the output end of the optical waveguide;

an integrated optical attenuator for selectively blocking a percentage of light which exits the output end, the optical attenuator being selectively positionable within a range of attenuating positions;

a photodetector having a photosensitive surface for receiving light;

wherein when light exits the output end of the optical waveguide, the light is selectively attenuated by the optical attenuator in an amount selected from between 0 and 99.9999 percent, and at least a portion of the non-attenuated light is refracted by the lens and directed to the photosensitive surface of the photodetector.

In another embodiment of the invention, there is provided: A method of extending the dynamic range of an optical coupling assembly comprising:

causing a light signal to be transmitted through an output end of an optical waveguide;

coupling the light signal onto the photosensitive area of the photodetector;

selectively attenuating a percentage of the light signal in an amount selected from between 0 and 99.9999 percent employing;

spatially filtering a portion of the light signal which is diffracted by the attenuating step;

directing the light signal to an absorption area of a photodetector; and wherein the optical coupling assembly is the packaged optical coupling assembly according to claim 1.

Optionally, the optical coupling assembly may be employed in an optical communication system comprising a data generator for generating light data, a transmitter for transmitting light data, and a receiver for receiving light data.

It is an object of the invention to provide a receiver with extended dynamic range that integrates attenuation and coupling functionality in a single packaged device and overcomes the disadvantages of the prior art, e.g. to obtain a lower cost compact solution to the prior art problems by providing VOA and PD in a single, integrated package.

It is another object of the invention to provide a receiver employing a photodetector with integrated electrically controllable VOA functionality that has higher sensitivity.

It is still another object of the invention to provide a receiver employing photodetector with integrated electrically controllable VOA functionality with reduced package complexity.

To achieve the objectives, the receiver with integrated VOA functionality is designed as one integrated system. Increase in sensitivity, reduction in cost and size, as well as in package complexity are achieved by reducing the number of optical interfaces. In particular, that is accomplished by eliminating the need for coupling the VOA output to the active area of PD, as well as by reducing the number of lenses in the system.

The present invention employs an optical subassembly with a single lens that couples the light from an input fiber to the "active" area of a PD. Although any lens may be used for coupling, a ball lens is shown in the accompanied drawings. A single coupling lens constitutes a free-space propagation solution, with minimum number of optical interfaces that provides adequate space requirements between the input fiber and the lens for positioning of the attenuation mechanism, such as a light blocker. An aperture between the lens and the active area of photodetector is optionally used as a spatial filter to reduce the amount of light diffracted outside the boundary of the active area.

It is a further object of the invention to provide a micro-optical coupler assembly for coupling light to a high-speed PD that overcomes the disadvantages of the prior art, while achieving a high coupling efficiency, wide alignment tolerances, and high bandwidth.

It is yet another object of the invention to provide a coupling subassembly, which is easier to fabricate with higher yields and does not require fabrication of special features, such as mode spot size converters, refractive facets or TIR V-grooves.

It is still a further object of the invention to provide a coupling subassembly, which allows responsivity adjustment of the photodetector during manufacture.

To avoid the further difficulties of the prior art, the present invention optionally employs an optical subassembly, which launches the beam at an angle through a straight cleaved or dry-etched edge of the PD. The angular propagation is achieved by using an angle-polished or angle-cleaved fiber, herein referred to as an "angle-ended fiber". Alternatively, it is accomplished by positioning the fiber's cylindrical axis relative to the normal to PD absorption layer at an angle between 0 and 90 degrees (to achieve an angle of incidence of between 45 and 90 degrees or more preferably between 75 and 85 degrees).

When the photosensitive area of the PD is small, as is the case of very high-speed devices, an angle-ended fiber is used in conjunction with a micro-lens. The relative alignment of the fiber, micro-lens and absorption layer of the PD is provided to assure that the absorption layer is positioned in the vicinity of the beam waist. Alternatively, a lensed fiber, positioned at an angle relative to PD absorption surface layer normal, can be employed.

Adjustment in device responsivity is achieved by rotating the angle-ended fiber relative to its axis.

This invention will now be described with respect to certain embodiments thereof as illustrated in the following drawings wherein:

DESCRIPTION OF THE PREFERRED EMBODIMENTS

Figure 1:
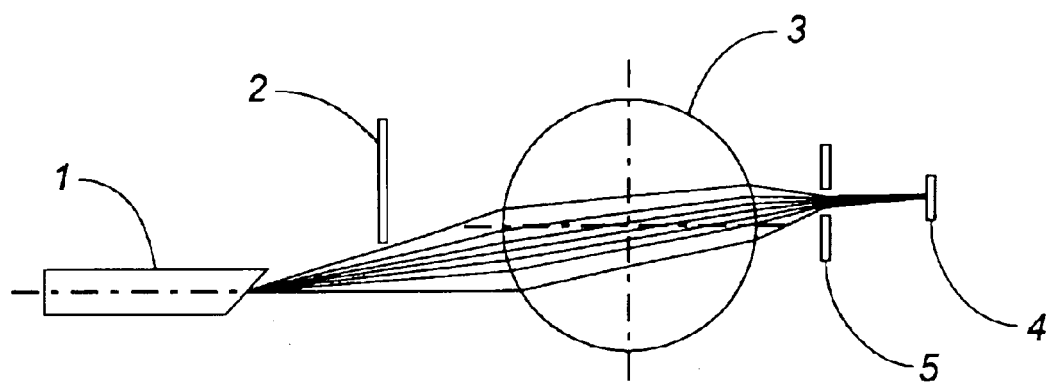
FIG. 1 is a side-plan view of one embodiment of the optical receiver according to the subject invention illustrated with the VOA blocker not engaged.

As illustrated in FIG. 1, the optical assembly according to the subject invention generally includes an optical subassembly with a single lens for coupling light transmitted from an input fiber to photosensitive area 4 of a photodetector (PD) and an integral optical blocker 2 for selectively attenuating the light (i.e. signal) when desired. In a particularly advantageous embodiment, the optical subassembly also, optionally, includes an aperture 5 located between lens 3 and photosensitive area 4 of the PD.

Figure 2:
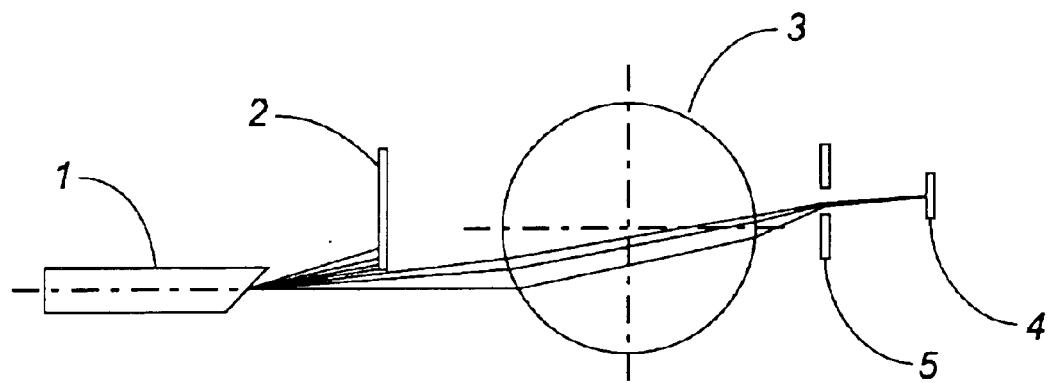
FIG. 2 is a side-plan view of the embodiment illustrated in FIG. 1 shown with the VOA blocker engaged.
Figure 3:
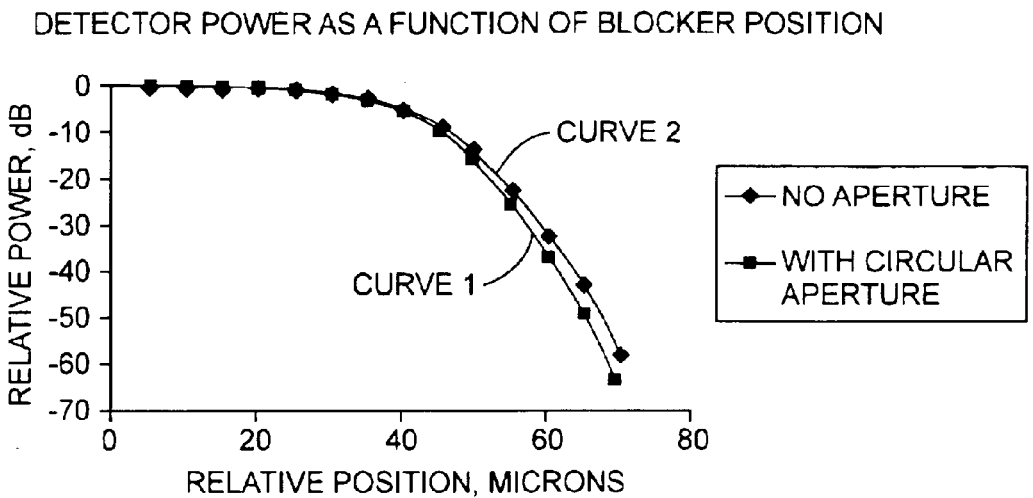
FIG. 3 illustrates the relative power in the beam reaching the active area of the PD as a function of a blocker position.

FIG. 1 illustrates a High Dynamic Range Receiver (HDRR), according to the subject invention, when blocking mechanism (optical attenuator) 2 is not activated and the receiver has maximum sensitivity. FIG. 2 illustrates the same embodiment as FIG. 1 but shows blocking mechanism 2 inserted into the input beam and thus attenuation of the input signal. In this embodiment, in order to reduce the amount of light reflected back from the fiber edge, the fiber edge is machined at an angle to the axis of the fiber. Because of the machined angle, the input signal exits the input fiber 1 at an angle to the fiber axis and thereafter propagates through the lens 3 from where it is delivered to the photosensitive area 4 of the PD through aperture 5. FIG. 3 illustrates the relative power in dB on the photosensitive area 4 of the PD as a function of the blocker position with (curve 1) and without the aperture (curve 2).

Aperture 5 serves as a spatial filter, in some embodiments as illustrated, cleaning up the beam that reaches the photosensitive area 4 of the PD. In particular, when blocker 2 is inserted into the input beam, a percentage of light is diffracted by the edge of the blocker and reaches the PD outside of the photosensitive area 4 optimized for response. That, in turn, causes performance degradation that manifests itself in bandwidth reduction of the receiver. Aperture 5 effectively prevents the diffracted portion of incoming light from "spilling" outside the boundary of PD photosensitive area 4 and thus prevents degradation of the receiver bandwidth.

Aperture 5 can be made, for example, as an opening in a metal foil assembled between the lens and the PD. The aperture can also be made as an integral part of a back-illuminated receiver, e.g. fabricated on a wafer level using lithographic processes on a PD surface that is opposite to the photosensitive area 4. Wafer-level fabrication is a preferable solution, because it eliminates the need for accurate alignment of discrete components (aperture 5 relative to the photosensitive area 4 of the PD) and their attachment, reducing the cost of fabrication and assembly.

Figure 7:
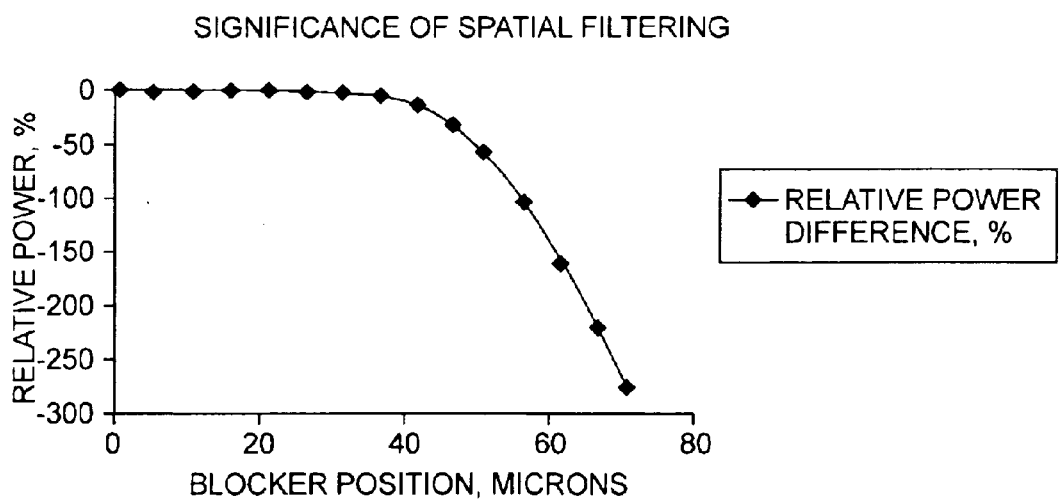
FIG. 7 illustrates the filtering properties of the aperture.
Figure 4:
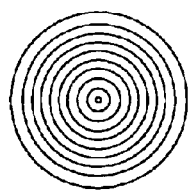
FIG. 4 illustrates a contour plot of light distribution at the photosensitive area of the PD for an un-attenuated beam.
Figure 5A:
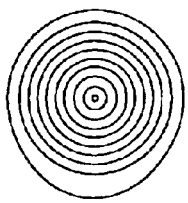
FIGS. 5a–5d illustrates a contour plot of light distribution on the photosensitive surface area of the PD when the VOA is activated and produces −3 dB (50%) of attenuation.
Figure 5B:
Figure 5C:
Figure 5D:
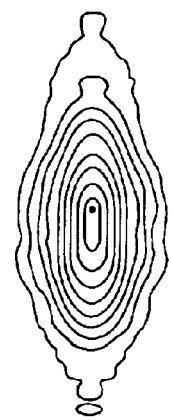
Figure 6A:
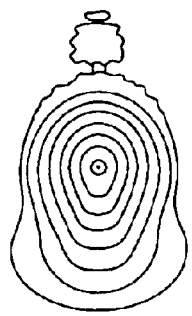
FIGS. 6a–6d illustrates a contour plot of light distribution on the photosensitive surface area of the PD when the VOA is activated and produces −20 dB (99%) of attenuation.
Figure 6B:
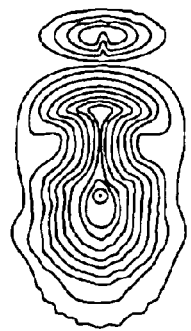
Figure 6C:
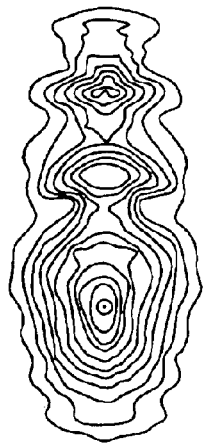
Figure 6D:
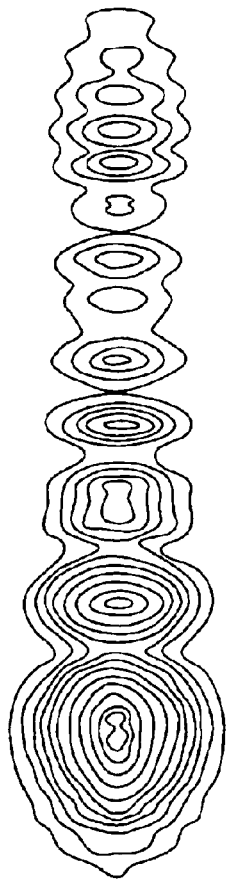

The filtering properties of aperture 5 are illustrated in FIGS. 4 through 6. When the VOA is not engaged so that the blocker is not inserted in the beam (FIG. 1), the size of the un-attenuated beam on the photosensitive area 4 of the PD is well confined and the intensity distribution has an approximately Gaussian shape as seen from FIG. 4. FIGS. 5a through 5d illustrate exemplar intensity distributions on the photosensitive area 4 of the PD at attenuation of −3 dB (i.e. when the blocker is inserted in the beam) for the case when the aperture size was selected to be 7 microns, 10 microns, 15 microns and with no aperture (infinite size), respectively. FIGS. 6a through 6d present intensity distributions on the photosensitive area 4 of the PD at an attenuation of −20 dB for the case when the aperture size was selected to be 7 microns, 10 microns, 15 microns and with no aperture (infinite size), respectively. As it may be seen from comparison of FIGS. 5d and 6d (which correspond to the case when no aperture were employed) to FIGS. 5a through 5c and 6a through 6c, when the apertures of different size are employed, the apertures perform spatial filtering of the diffracted field. Furthermore, the amount of light filtered by the aperture increases with increase in attenuation level as is shown on FIG. 7. As can be seen from FIG. 7, at high levels of attenuation, the amount of power in the diffracted light exceeds the amount of power in the non-diffracted portion of the beam.

Based on the concepts disclosed above, a successful and unique high-speed (10 Gb/s) high dynamic range receiver and integrated VOA was built (i.e. a receiver with extended dynamic range that integrates attenuation and coupling functionality). In particular, the integrated VOA functionality allowed extension of the dynamic range of the receiver by two orders of magnitude (20 dB), while the sensitivity of the integrated solution was improved by approximately 1 dB (20%) compared to a discrete solution employing an individually packaged VOA connected to a receiver. Specifically, the improvement in sensitivity was due to a reduction of insertion loss by reducing the number of optical interfaces in the integrated HDRR.

Figure 8A:
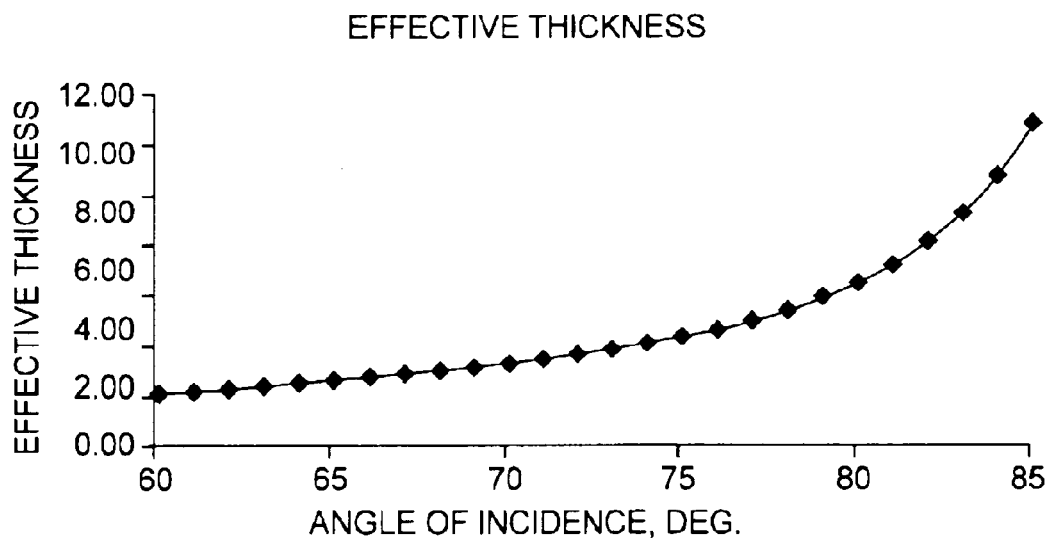
FIG. 8A illustrates the change in effective thickness of the absorption region as a function of the angle of incidence of the light inside the photodiode on the photodetector's active region.

Turning now to a further embodiment of the subject invention, herein is described a unique coupling assembly for coupling light to a high-speed PD which may be optionally coupled to the inventive, integrated receiver and VOA described above (i.e. the receiver with extended dynamic range that integrates attenuation and coupling functionality). According to the present embodiment of the subject invention, high coupling efficiency to the absorption layer of a PD is achieved by causing light which is coupled to the PD to impinge at an angle of incidence selected from a range of angles between at least 45 degrees and less than 90 degrees. In particular, the angular propagation through the absorption layer (i.e. the angle of incidence on the absorption layer) is achieved by using an angle-ended fiber (or, alternatively, by angling the axis of the fiber relative to the PD). Furthermore, adjustment of the responsivity of the PD is accomplished by altering the effective thickness of the absorption layer through adjustment of the angle of incidence on the absorption layer surface. It is noted, in this regard, that a preferred range for the angle of incidence is approximately 60–85 degrees or in some cases 75–85 degrees (responsivity adjustment is also achievable with defocusing.) The effective thickness $t_{eff}$ of the absorption layer as a function of the angle of incidence $\theta$ is defined as:

$$t_{eff} = t_o (\cos(\theta))^{-1} \quad (1)$$

where $t_o$ is the absorption layer thickness. The graph of normalized effective thickness $t_{eff}/t_o$ as a function of the angle of incidence is shown schematically in FIG. 8A.

In a tangential plane (the plane defined by the axis of the fiber and the normal to the absorption layer of the PD) the deflection angle $\alpha$ of the beam exiting the fiber complements the angle $\theta$ of incidence on the absorption layer of the PD to 90 degrees:

$$\alpha + \theta = 90° \quad (2)$$

Figure 8B:
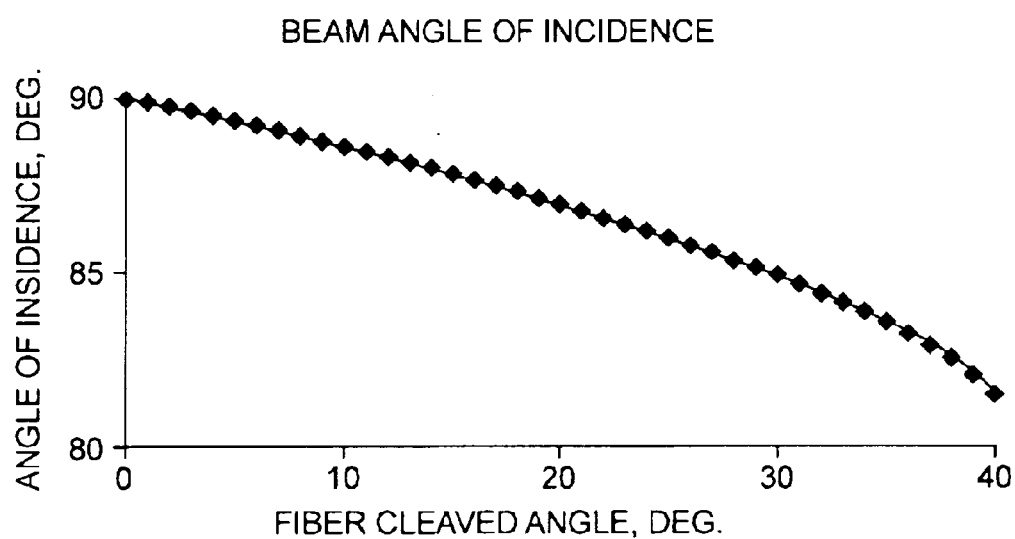
FIG. 8B illustrates a graph showing the chief ray angle of incidence onto the PD absorption layer as a function of the fiber end-facet angle.
Figure 8C:
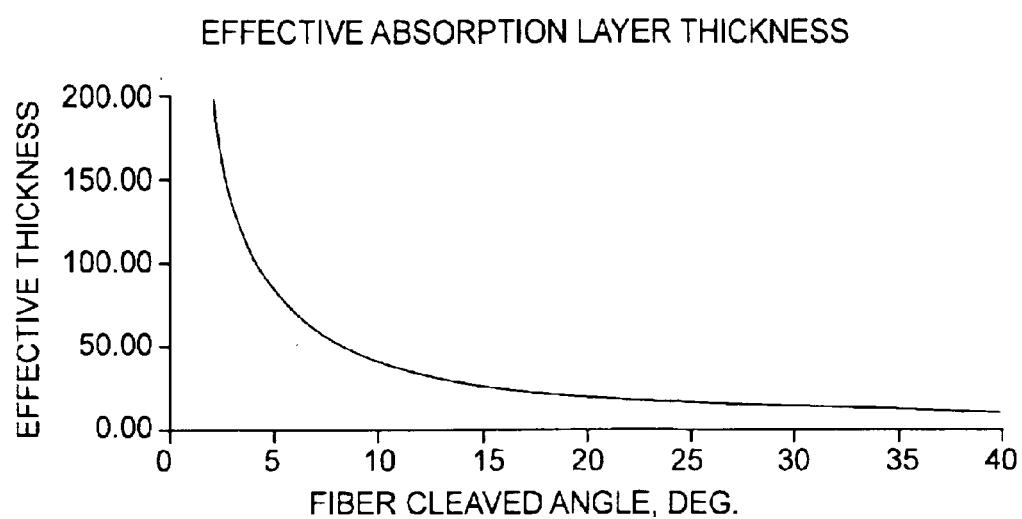
FIG. 8C illustrates a graph showing the effective absorption layer thickness as a function of the fiber cleaved angle for propagation in the optical tangential plane.
Figure 12:
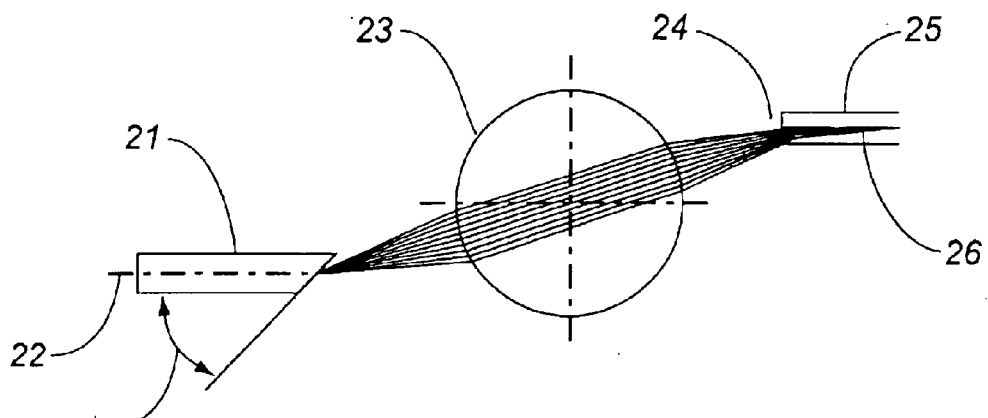
FIG. 12 illustrates a cross-sectional view of another coupling sub-assembly according to the present invention.

The beam deflection angle $\alpha$ is a function of the fiber end-facet angle $\phi$ (defined in FIG. 12). The beam angle $\theta$ of incidence on the absorption layer of the PD is related to the fiber cleaved angle $\phi$ as follows:

$$\theta = 90° - \arcsin\left(\frac{n_2}{n_3} - \sin\left(\arcsin\left(\frac{n_1}{n_2} - \sin(\varphi)\right) - \varphi\right)\right)$$

where $n_1$ is the effective or modally averaged refractive index of the fiber, $n_2$ is the refractive index of the surrounding medium, and $n_3$ is the refractive index of the PD substrate material. The beam angle of incidence $\theta$ as a function of fiber cleaved angle $\phi$ is shown on the graph of FIG. 8B (an exemplar cleave angle $\phi$ being preferably selected from between 10–50 degrees). The effective thickness $t_{eff}$ of the absorption layer as a function of the fiber cleaved angle $\phi$ is shown in FIG. 8C.

Figure 9:
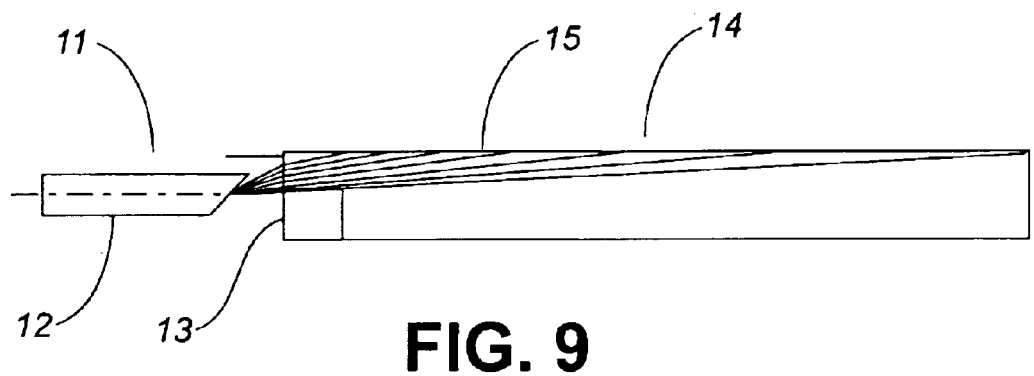
FIG. 9 illustrates a cross-sectional view of the photodiode and coupling sub-assembly according to the present invention where the light from an angle-polished fiber propagates through a straight edge PD and is incident at an angle onto the photosensitive area.

FIG. 9 illustrates an example when the photosensitive area of PD is relatively large (i.e. a PD with relatively low bandwidth). The input fiber 11 with axis of symmetry 12 is placed in proximity to the straight cleaved facet 13 of PD 14 and absorption layer 15. The light beam exiting the fiber is deflected at the angle $\alpha$ from the initial direction defined by the axis 12 and is directed through the facet 13 onto the absorption layer 15.

In an alternative embodiment, the angular propagation is simply accomplished by adjusting the orientation of the axis 12 of the input fiber 11 relative to the normal of the absorption layer 15 (to obtain an angle of incidence on the absorption layer of at least 45 degrees and less than 90 degrees but more preferably between 75 and 85 degrees).

Still furthermore, the angle of incidence on the absorption layer 15 can be adjusted by rotating the fiber 11 relative to its axis. In that case the beam deviates from tangential propagation and adjustment in fiber 11's lateral position relative to the absorption layer 15 of the PD 14 is required for optimum coupling.

Figure 10:
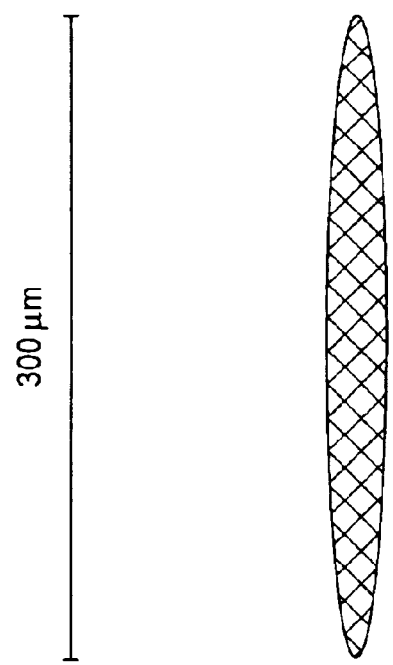
FIG. 10 illustrates a spot diagram on the photosensitive surface area of the PD (in plane view) corresponding to FIG. 9.
Figure 11:
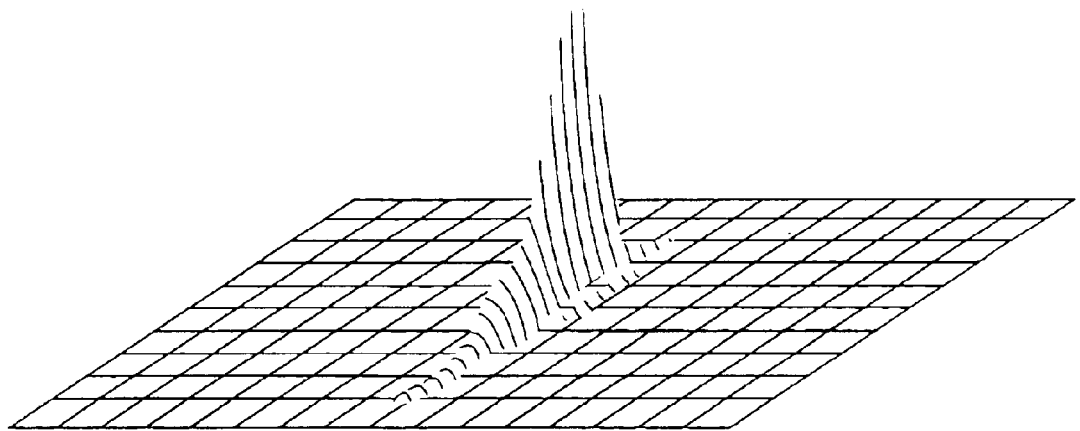
FIG. 11 illustrates the light intensity distribution on the surface of the PD photosensitive area corresponding to FIG. 9.

FIGS. 10 and 11 show respectively the spot diagram and light intensity distributions at the absorption layer 15 that corresponds to FIG. 9. In this example, the angle of incidence $\theta$ of the beam on the absorption layer 15 was selected to be a particularly efficacious 85 degrees, an angle which corresponds to the normalized effective thickness of the PD absorption layer $t_{eff}/t_o$=11.5. Due to beam divergence, substantial overfilling of the small photosensitive area takes place, such that the device is preferably used in combination with PDs having relatively large active area sizes. The size of the spot diagram on the absorption layer, which corresponds the angle of incidence of 85 degrees, was calculated to be 15 $\mu$m by 250 $\mu$m.

Figure 13:
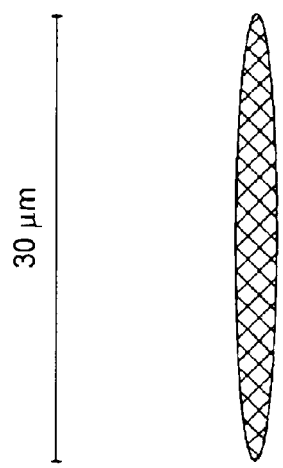
FIG. 13 illustrates a spot diagram on the photosensitive surface area of the PD corresponding to FIG. 12.
Figure 14:
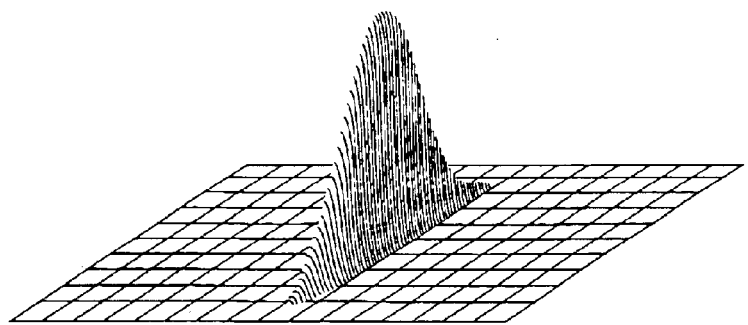
FIG. 14 illustrates the light intensity distribution on the surface of the PD photosensitive area corresponding to FIG. 12.

Another embodiment, illustrated in FIG. 12, is well suited for use with small area, high speed PDs. In this embodiment, the angle-ended input fiber 21 with axis of symmetry 22 deflects the output beam at angle $\alpha$ and directs it onto a micro-lens 23. Lens 23 then further directs the beam through the straight cleaved or etched facet 24 of the photodiode 25 onto the absorption layer designated by numeral 26. High coupling efficiency is achieved by using a micro-lens 23 in conjunction with angle-ended fiber 21, while launching the light through the straight cleaved facet 24 of the PD 25 at an angle so that the absorption layer 26 is positioned in the vicinity of the beam waist defined by the relative position of the fiber 21 and the lens 23 as well as by the optical properties of the lens 23. The spot diagram and light intensity distribution at the absorption layer 26 illustrated in FIG. 12 are shown in FIGS. 13 and 14 respectively. In this embodiment, the size of the spot diagram on the absorption layer, corresponding the angle of incidence of 85 degrees (normalized effective thickness of the PD absorption layer $t_{eff}/t_o$=11.5), was calculated to be 2 $\mu$m by 25 $\mu$m.

Device responsivity adjustment can be accomplished during the assembly stage by changing the angle of incidence on the absorption layer 26. The angle of incidence on the absorption layer 26 can be adjusted, for example, by rotating the fiber 21 relative to its axis 22. In that case the beam deviates from tangential propagation and adjustment in lateral position of the fiber 21, lens 23, and the absorption layer 26 of the PD 25 is thus required for optimum coupling.

As has been stated above, the unique coupling assembly for coupling light to a high-speed PD may optionally be, in certain embodiments, coupled to the integrated receiver and VOA described above (i.e. the receiver with extended dynamic range that integrates attenuation and coupling functionality). This is accomplished by simply selecting and thereafter implementing an appropriate angle of incidence on the PD for the receiver according to the criteria and apparatus delineated above. In such embodiments, high coupling efficiency to the absorption layer is achieved as well as is increased dynamic range and decreased cost, size, and complexity.

Once given the above disclosure, many other features, modifications, and improvements will become apparent to the skilled artisan. Such other features, modifications, and improvements are therefore considered to be a part of this invention, the scope of which is to be determined by the following claims:

We claim:

1. A packaged optical coupling assembly having an integrated selectively positionable optical attenuator comprising:
   an optical waveguide for transmitting light having an axis extending therethrough, said optical waveguide having an output end;
   a lens for coupling light which exits said output end of said optical waveguide said lens having a focal plane;
   a photodetector having a photosensitive surface for receiving light disposed at said focal plane of said lens;
   an integrated optical attenuator located in a free space region between said lens and said output end of said optical waveguide for selectively blocking a percentage of light which exits said output end, said optical attenuator being selectively positionable within a range of attenuating positions;
   wherein when light exits said output end of said optical waveguide, the light is selectively attenuated by said optical attenuator in an amount selected from between 0 and 99.9999 percent, and at least a portion of the non-attenuated light is refracted by said lens and directed to said photosensitive surface of said photodetector.

2. A packaged optical coupling assembly according to claim 1 further including an aperture for spatially filtering light diffracted by said optical attenuator.

3. A packaged optical coupling assembly according to claim 2 wherein said aperture is located between said lens and said photosensitive surface of said photodetector.

4. A packaged optical coupling, assembly according to claim 3 wherein light which exits said output end of said optical waveguide is directed at an angle to said axis of said optical waveguide through said lens thereby to reduce optical return loss.

5. A packaged optical coupling assembly according to claim 4 wherein said output end of said optical waveguide is cleaved at an angle such that light which exits said output end exits at an angle relative to said optical waveguide axis.

6. In an optical communication system comprising a data generator for generating light data, a transmitter for transmitting light data, and a receiver for receiving light data, the improvement comprising the optical coupling assembly according to claim 1.

7. A packaged optical coupling assembly according to claim 2 wherein said aperture is formed lithographically during a photodetector fabrication process.

8. A packaged optical coupling assembly according to claim 2 wherein said lens comprises a ball lens.

* * * * *